United States Patent [19]
McGlory

[11] 4,313,993
[45] Feb. 2, 1982

[54] LAMINATED INSULATION

[76] Inventor: Joseph J. McGlory, 13 Kathryn Rd., Chalfont, Pa. 18914

[21] Appl. No.: 140,005

[22] Filed: Apr. 14, 1980

[51] Int. Cl.³ .................. B32B 3/00; B32B 3/28; B32B 5/32
[52] U.S. Cl. .................. 428/178; 428/166; 428/332; 428/920; 428/311.5; 428/316.6
[58] Field of Search .......... 428/166, 119, 178, 310, 428/315, 920, 921, 332, 313, 314; 312/214

[56] References Cited
U.S. PATENT DOCUMENTS

| | | | |
|---|---|---|---|
| 822,848 | 6/1906 | Kunz | 428/920 |
| 2,578,188 | 12/1951 | Ionides et al. | 154/28 |
| 2,746,892 | 5/1956 | Elfving | 154/45 |
| 2,849,758 | 9/1958 | Plumley et al. | 52/585 |
| 3,078,003 | 2/1963 | Kesling | 220/9 |
| 3,142,599 | 7/1964 | Chavannes | 428/178 |
| 3,238,002 | 3/1966 | O'Connell et al. | 312/214 |
| 3,597,891 | 8/1971 | Martin | 428/178 |
| 3,619,340 | 11/1971 | Jones | 161/139 |
| 3,753,843 | 8/1973 | Hutchinson | 428/310 |
| 3,790,243 | 2/1974 | Whorton | 312/214 |
| 3,840,425 | 10/1974 | Finelli et al. | 428/920 |
| 3,911,190 | 10/1975 | Myers et al. | 428/315 |

Primary Examiner—Paul J. Thibodeau
Attorney, Agent, or Firm—Zachary T. Wobensmith, 2nd; Zachary T. Wobensmith, III

[57] ABSTRACT

Laminated insulation is provided that is of increased efficiency without any great increase in the total thickness of insulation used which has an internal reflector which reflects back both hot and cold air from the internal reflector. The structure includes a plurality of plastic skins with air bubbles trapped therebetween which structure is laminated to other types of insulation and may have internal provisions to increase its strength.

7 Claims, 6 Drawing Figures

LAMINATED INSULATION

BACKGROUND OF THE INVENTION

1. Field of the Invention

This invention relates to laminated insulation structure of the type which includes an internal reflector structure that is impervious to air and has insulating properties.

2. Description of the Prior Art

Many different structures and materials have been proposed as insulation including urethane foam and blankets of glass fibers. When air at one temperature passes through porous insulation material such as urethane or glass fiber blankets it meets air at another temperature. The air passage through the insulation material is slowed down by the quality of the insulation, the thickness and/or density of the insulation all of which help to determine the degree with which the insulation resists temperature change. In structure which is skinned on each side such as those employed in the refrigeration industry the metal or plastic skin in contact with the porous insulation acts as a heat sink and hot air flow is induced within the insulation in a direction towards the colder skin.

Various types of heat insulation have heretofore been proposed.

Kunz, in U.S. Pat. No. 822,848, shows laminated heat insulation particularly intended for refrigerators which comprises outer layers A and B of paper or the like with parallel corrugated strips C of similar material with interposed partition walls D of similar material.

For thick insulating walls light carded fiber such as hair or wool, or cotton wadding, between tissue paper or calendared fiber may be employed in layers E, separated by paper partitions F. The carded fiber is preferably slightly compressed and cemented in place to avoid packing down after installation. These layers are preferably formed into relatively small blocks or pads which are interposed between two or double outer layers of corrugated material G. The edges of the blocks are bound or lined with stiff sheets H of paper or cardboard or similar material previously coated with a suitable adhesive to cement the edges of all the sheets together.

This structure, with its paper or cardboard lamination is particularly susceptible to retention of condensate which is destructive of paper, cardboard and the like. There is no suggestion of an internal impervious heat reflecting material.

Ionides et al., in U.S. Pat. No. 2,578,188, shows a heat resistant covering which comprises three different portions or layers. The first layer 10 forming a lining or inner side consists of an absorbent material of low heat conductivity, preferably non-combustible. The lining may be a single layer or laminations of glass fiber cloth, wool impregnated with a fire resistant imparting solution. The first layer is completely overlaid by a second layer of water and water vapor impermeable material such as rubber-like polyvinyl plastics, nylon sheeting or any flexible synthetic rubbers or plastics which are impermeable to both water and water vapor. An outer layer 12 is provided of a material of low heat conductivity and capable of absorbing relatively large quantities of water. The layer 12 may be a single layer or lamination of glass fiber cloth, preferably of fire resistant thermal insulating material. The outer layer 12 is intended to be saturated with water to absorb heat for passage into the atmosphere as heat of vaporization. The primary purpose is for dissipation of intense external heat with the internal temperature maintained at about 60° C. The layer 11 would be a heat conductor, not an insulating and reflecting layer and the inner and outer layers function in an entirely different manner.

Elfving, in U.S. Pat. No. 2,746,892 shows a multilayer heat insulating material. In FIG. 1 two bright and hard corrugated aluminum foils 11 and 13 are employed separated by a similarly corrugated film 12 of cellulose acetate, polyvinyl chloride or silicone plastic. The structure does not include any impervious central insulating and reflecting layer with fibrous or foamed insulation on each side, and within bounding walls.

Kesling, in U.S. Pat. No. 3,078,003 shows a refrigerator cabinet construction in which, as shown in FIGS. 4 and 5, an outer metal panel 16 and an inner molded plastic panel member have the space therebetween filled with insulating material 28. In FIG. 2, an outer sheet metal shell 26 spaced from an inner sheet metal liner 27 having a thin polyethylene liner 29 has the space therebetween filled, as before, by insulating material 28. The insulating material 28 is a foamed-in-place polyethylene which is bonded to the shell 26 and to the liner 27. No central or interior impervious insulating and reflecting layer is shown with insulating lamination on both sides thereof and within bounding walls.

O'Connell et al., in U.S. Pat. No. 3,238,002, shows an insulated shipping container requiring liquid nitrogen with a laminated wall for maintaining an extremely low temperature, stated as −129° C. The laminae include a rigid self supporting outer shell or wall 2, and an inner vessel 3 for providing an evacuable space 4. The space 4 has disposed therein alternating layers of a metallic radiant heat barrier 5 and a fibrous substance of low thermal conductivity 6. A specimen holder 7 is provided for storing the specimen and a low heat conductive closure plug 9 is provided for the receptacle.

There is no suggestion in this patent of the structure of the present invention.

Jones, in U.S. Pat. No. 3,619,340, shows a multilayered thermal insulation material. As shown in FIG. 3, successive layers are shown of an outer protective layer 60, a thin sheet of Mylar 61 glued to the sheet 60, an embossed layer 62, with a glue line 63, an embossed sheet 64 with larger bosses, a layer 65 of aluminized Mylar, embossed layers 67 like the layer 62, and a lower protective layer 68 having an inner layer 65 of an aluminized Mylar sheet.

This structure also differs from and is not suggestive of the structure of the present invention.

Whorton, in U.S. Pat. No. 3,790,243 shows a closure or door 16 for a refrigerated housing which includes, as shown in FIGS. 2 and 3, a lower member or housing C with an upper member D. The lower member C may be of molded polyvinyl chloride having therein a thin planar sheet 38 with insulation 40 therebelow in the lower member of expandable polyurethane. This patent also does not suggest the structure of the present invention.

Myers et al., in U.S. Pat. No. 3,911,190 show a composite thermal insulating structure which includes a sheet 1 of thermoplastic material bonded to a rubber-modified high nitrile polymer 2 containing a nitrile monomer which in turn is bonded to a cellular insulation material 3 wherein the cells of the insulation are filled with a major amount of a halogenated aliphatic or cycloaliphatic hydrocarbon. In FIG. III the material is shown with the cellular layer bonded to an exterior surface of a recreation vehicle. In FIG. IV a boat hull is illustrated in which the laminated material is sandwiched between two layers of the lamination 2 which is in turn bonded to a thermoplastic sheet 1. This patent also does not teach the laminate of the present invention.

It has also heretofore been proposed to provide laminated synethetic plastic sheets defining air bubbles therebetween, for use as a packaging material for fragile articles of glass and the like.

SUMMARY OF THE INVENTION

In accordance with the invention a laminated thermal insulation is provided, suitable for building insulation, for insulation of motor vehicles, boats and the like, or for refrigerating equipment, having an interior impervious central insulating and reflecting layer with synthetic plastic sheets defining air bubbles and having panels bonded on each side of the central layer of foamed urethane or fiber glass which is porous and permit air circulation, and with or without exterior skins, contracting walls or enclosures.

It is the principal object of the invention to provide a laminated thermal insulation which is simple in construction, effective in its action and which has a wide variety of applications.

It is a further object of the invention to provide a laminated thermal insulation which has a central layer of impervious light weight insulating and reflecting material with panels of insulating material bonded on each face thereof.

It is a further object of the invention to provide a laminated thermal insulation utilizing a light weight, inexpensive, impervious, central layer of synthetic plastic sheets defining air bubbles which have thermal insulating action.

It is a further object of the invention to provide a laminated thermal insulation having a light weight, inexpensive, impervious central layer of synthetic plastic sheets defining air bubbles with reinforcing synthetic plastic sheets on one or more faces of the central layer and which further prevents air leakage from one side of the central layer to the other.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
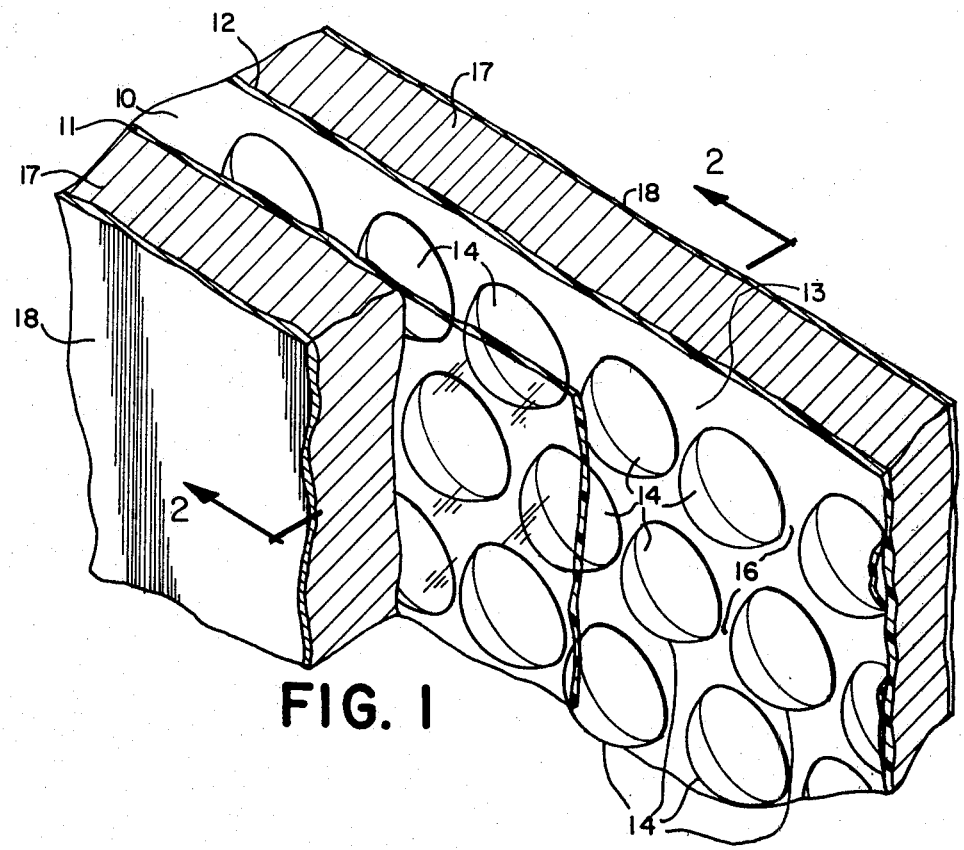
FIG. 1 is a view in perspectve of laminated heat insulation in accordance with the invention.
Figure 2:
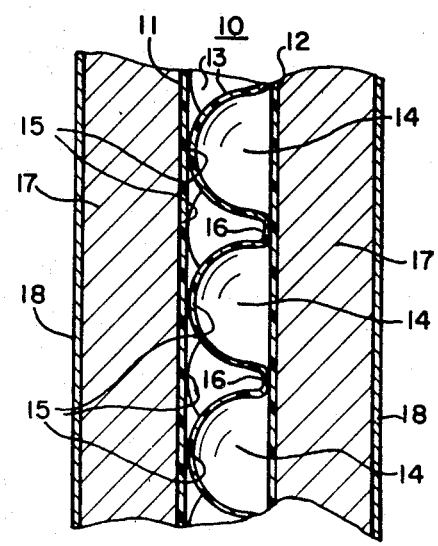
FIG. 2 is a vertical sectional view taken approximately on the line 2—2 of FIG. 1.

Referring now more particularly to FIGS. 1 and 2 of the drawings in which one preferred embodiment of the invention is illustrated a central layer 10 is provided comprising spaced synthetic plastic sheets 11 and 12 having sheet 13 therebetween formed and shaped to provide a plurality of air bubbles 14 with contacting portions 15 and 16 of the sheet 13 secured respectively to the sheets 11 and 12.

The air bubbles 14 may be in parallel rows and columns but are preferably disposed in an alternating arrangement in successive rows for more effective thermal insulating action, and in a specific embodiment have a diameter of the order of one and one quarter inches and a thickness of the order of three eighths of an inch.

In contact with each of the outer faces of the sheets 11 and 12 and held thereagainst in any desired manner, such as by spots of adhesive or the like, are panels 17 extending in covering relation to the central layer 10 which can be of any desired thermal insulating material. For this purpose glass fiber insulation of the desired thickness may be employed in accordance with the specific field of use. Another suitable material is porous urethane foam which may be bonded to the sheets 11 and 12 for greater strength.

The exteriors of the panels 17 may each, depending on the field of use, have in engagement therewith an outer cover or skin 18 which can be of wood, paper, synthetic plastic, metal foil, or sheet metal, including spaced walls of refrigeration equipment in which the laminated heat insulation of the invention is used.

Figure 3:
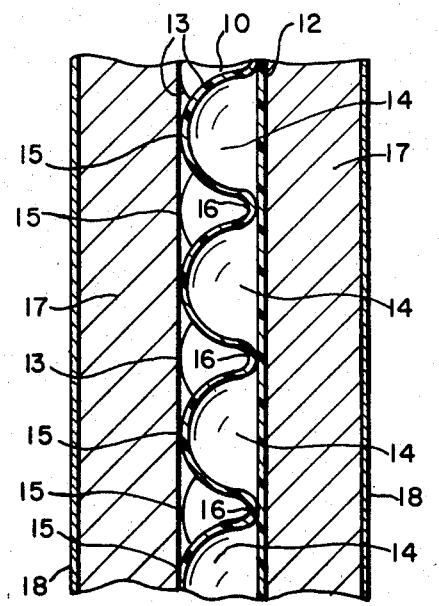
FIG. 3 is a view similar to FIG. 2 showing another embodiment of the invention.

Referring now to FIG. 3, a modified form of lamination is shown in which the sheet 11 has been omitted.

Figure 4:
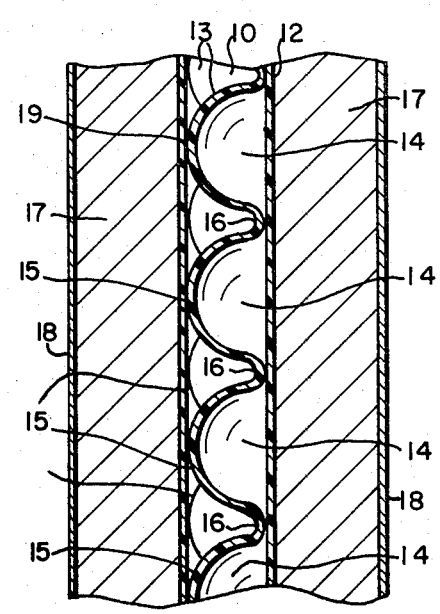
FIG. 4 is a view similar to FIG. 2 showing another embodiment of the invention.

In FIG. 4, a further modified form of the invention is illustrated in which, in place of the sheet 11, a sheet 19 of nylon is employed to add greater strength and prevent air leakage.

Figure 5:
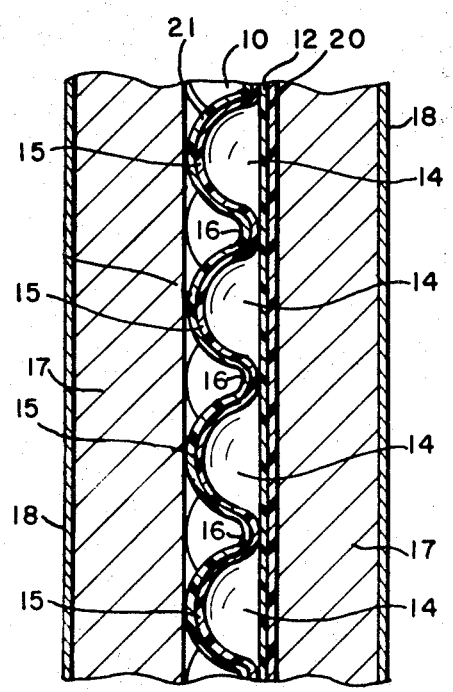
FIG. 5 is a view similar to FIG. 2 showing another embodiment of the invention.

In FIG. 5, a further modified form of the invention is illustrated in which a sheet 20 of nylon is provided between the sheet 12 and the panel 17 to add greater strength and prevent air leakage. A sheet 21 of nylon is applied on the sheet 13 and shaped therewith.

Figure 6:
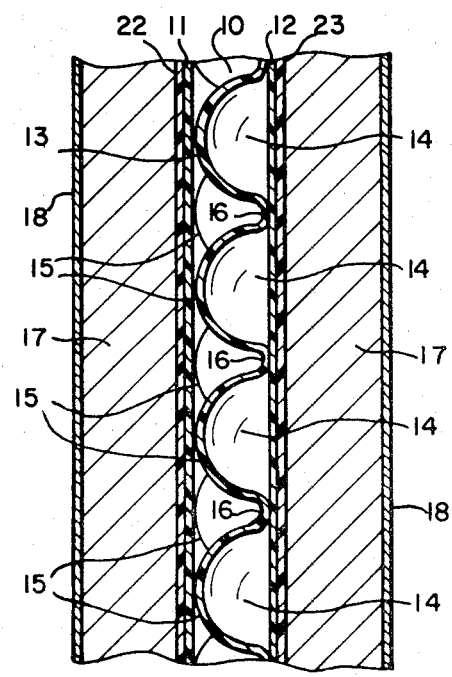
FIG. 6 is a view similar to FIG. 2 showing another embodiment of the invention.

In FIG. 6 the structure is that similar to those previously described but sheets 22 and 23 of nylon are provided outside the sheets 11 and 12.

It should be noted that if the covers or skins 18 are of metal they serve as heat sinks and but for the interposition of the central layer 10 there would be a flow of air from the hot side to the cold side.

The central layer 10 serves not only as an impervious barrier but also prevents sweating from condensation. The nylon sheets 19 to 23, inclusive, add to the physical strength of the laminated thermal insulation and prevent air leakage even under high pressure.

I claim:

1. A laminated thermal insulation comprising
    a central impervious thermal insulating and reflecting layer comprising a synthetic plastic sheet formed and shaped to provide rows of air bubbles secured to at least one planar synthetic plastic sheet so as to enclose said air bubbles, panels on each side of said central layer of porous thermal insulating materials which permit air circulation therethrough,
said panels being selected from the group consisting of glass fibers and foamed synthetic plastic, and
an outer cover in engagement with the outer faces of said panels.

2. A laminated thermal insulation as defined in claim 1 in which
said outer cover is selected from the group consisting of wood, paper, synthetic plastic, metal foil and sheet metal.

3. A laminated thermal insulation as defined in claim 1 in which
at least one of said outer covers is of sheet metal.

4. A laminated thermal insulation as defined in claim 1 in which
at least one of said covers is of synthetic plastic.

5. A laminated thermal insulation as defined in claim 1 in which
said air bubbles are of a diameter of the order of one and one quarter inches.

6. A laminated thermal insulation as defined in claim 1 in which
said layer includes an additional sheet of impervious synthetic plastic for reinforcement of said layer.

7. A laminated thermal insulation as defined in claim 1 in which
said panels are of foamed urethane synthetic plastic.

* * * * *